Figure 6:
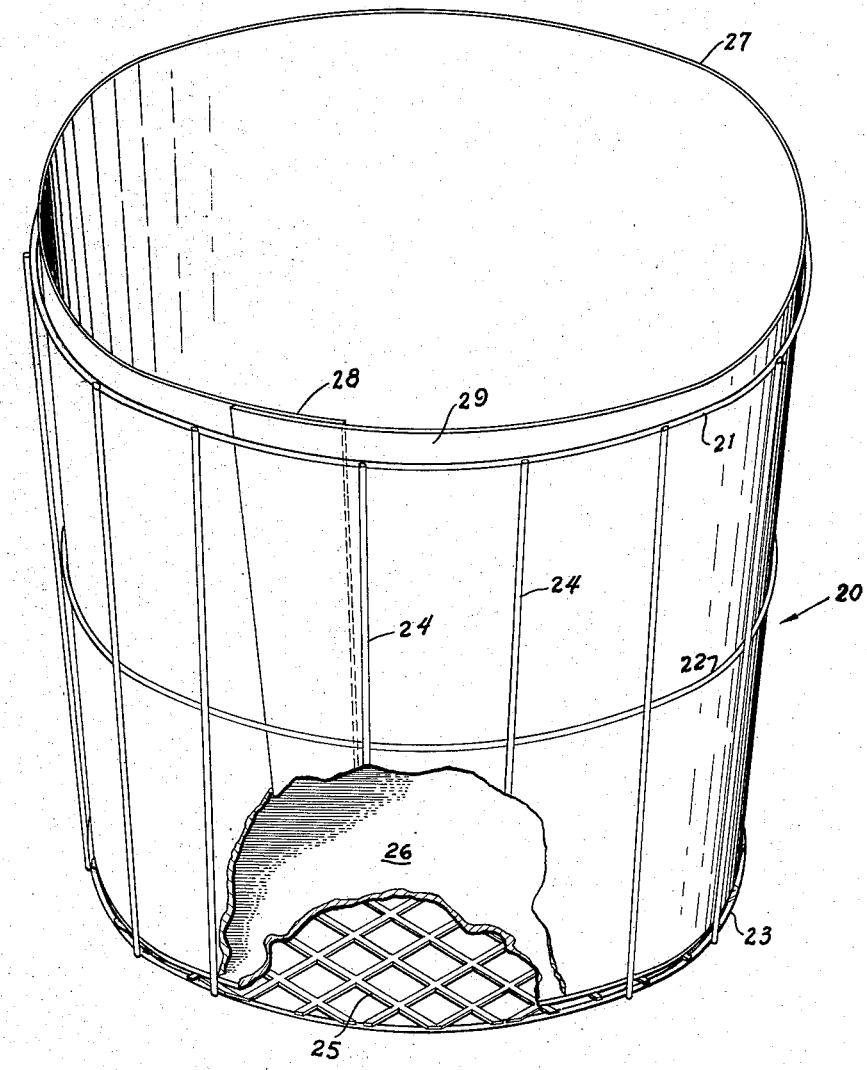

Nov. 22, 1960   F. F. LINDSTAEDT ET AL   2,960,798
NURSERY POTS
Filed Nov. 20, 1957   3 Sheets-Sheet 1
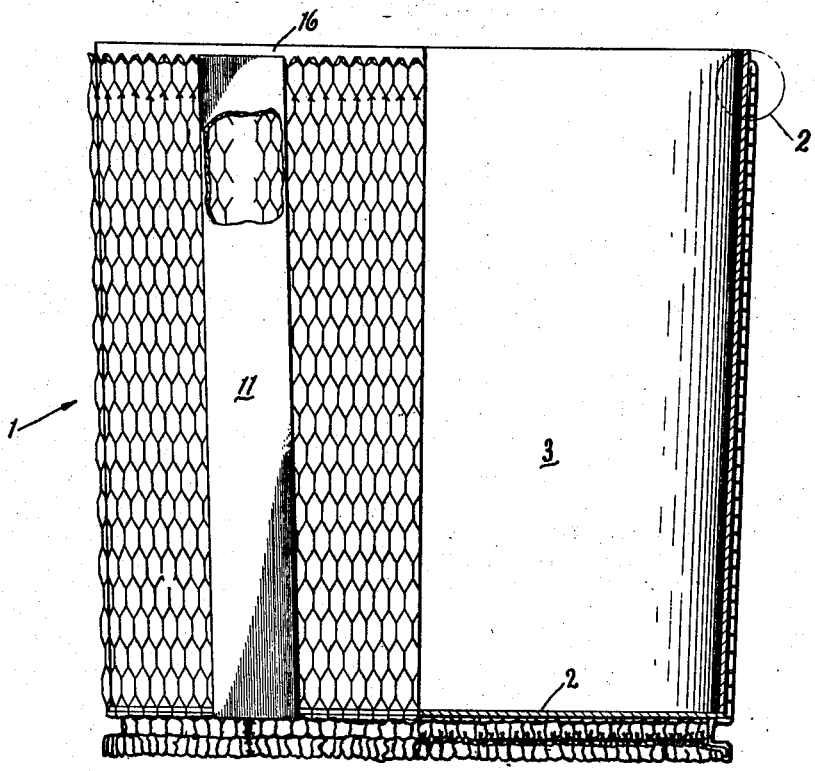
Fig. 1
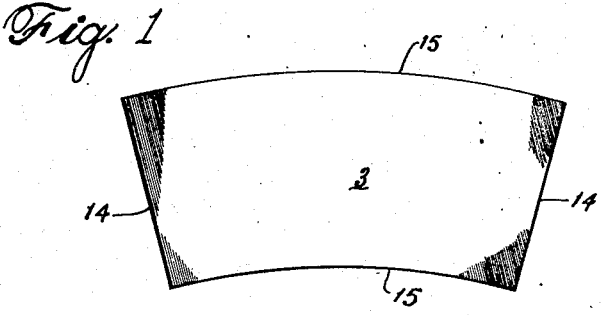
Fig. 2
Fig. 5
INVENTOR.
FRANK F. LINDSTAEDT
JERRY F HAMLIN
BY HUGHES CALL
A. Schaffp
ATTORNEY Nov. 22, 1960   F. F. LINDSTAEDT ET AL   2,960,798
NURSERY POTS
Filed Nov. 20, 1957   3 Sheets-Sheet 2
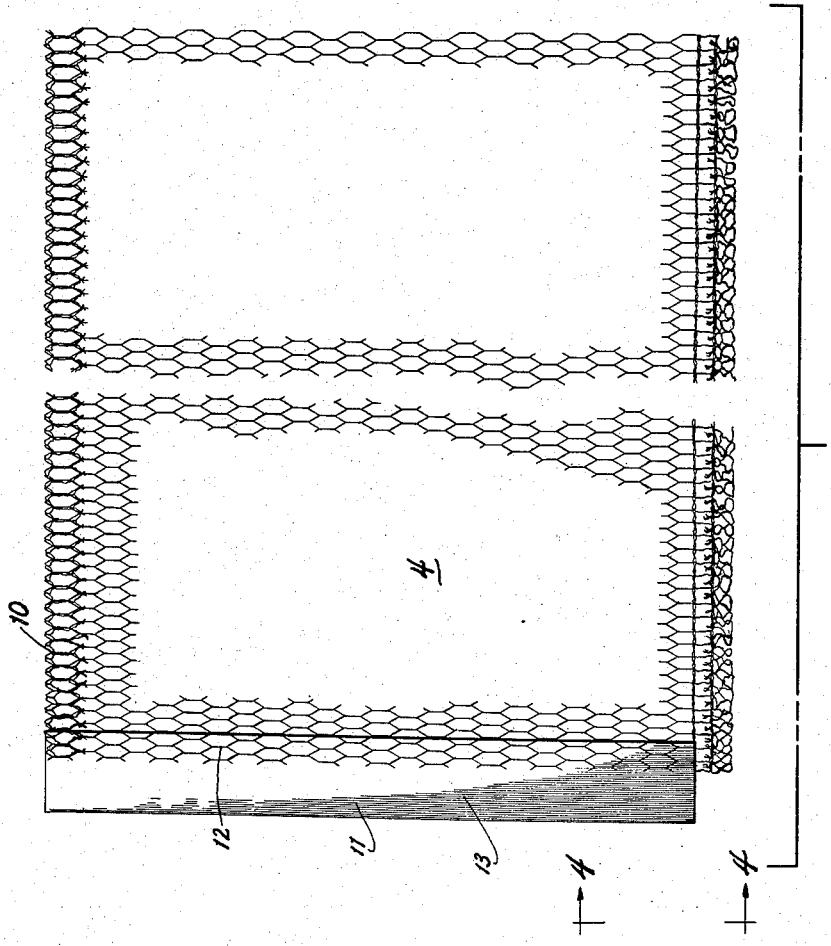
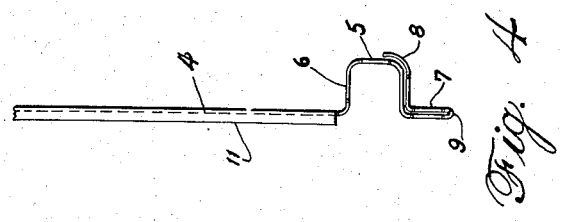
INVENTOR.
FRANK F. LINDSTAEDT
JERRY F. HAMLIN
BY HUGHES CALL
A. Schapp
ATTORNEY

INVENTOR.
FRANK F. LINDSTAEDT
JERRY F. HAMLIN
BY HUGHES CALL

*G. Schapp*
ATTORNEY

United States Patent Office 2,960,798
Patented Nov. 22, 1960

2,960,798
NURSERY POTS

Frank F. Lindstaedt, 109 Fawn Drive, San Anselmo, Calif., Jerry F. Hamlin, 42 Oakridge Road, San Rafael, Calif., and Hughes Call, 315 Montford Ave., Mill Valley, Calif.

Filed Nov. 20, 1957, Ser. No. 697,615

4 Claims. (Cl. 47—34)

The present invention relates to improvements in nursery pots, and its principal object is to provide a nursery pot which provides certain advantages over those now in use in appearance, economy, ease of handling, selectivity of use and in other respects, as will be hereinafter disclosed.

More particularly, the invention consists in an improved nursery plant pot consisting of a metal basket serving as an outer shell, and an inner liner.

The metal basket is made in the shape of an inverted cone, with the wall sloping outward at an angle of anywhere from one-quarter degree to fifteen degrees, but preferably about nine degrees for appearance and ease of stacking. It is intended to fabricate the basket of expanded metal, but it could be made also of a solid sheet, woven wire, or the like. The completed basket will be galvanized or otherwise protected from moisture, and may be finished in any one of several colors of oil paint, or other coatings to produce desired artistic effects.

The inner liner is made of a sheet of die-cut asphalt paper, light weight, although it may be made of any moisture-proof film material having similar characteristics. The liner will be made in two pieces, a flat circular disc serving as a bottom, and a side wall made of a single sheet of asphaltum felt, with overlapping edges.

The nursery plant pot may be manufactured in all current sizes of nursery pots used in nurseries, namely 1, 2, 3, 4 and 5 gallon sizes. Unlike existing waste products, the lard and petroleum can now used in nurseries, the product of the present invention may be made in any size desirable to accommodate changing requirements of the trade.

The preferred forms of our invention are illustrated in the accompanying drawings forming part of this application, in which:

Figure 1 shows a side view of one form of our nursery pot, with portions broken away to show the liner construction;

Figure 2, an enlarged sectional detail view of an upper portion of the pot identified by the circle 2 of Figure 1;

Figure 3, a fragmentary detail view of a flat sheet of expanded metal serving as a blank for the basket;

Figure 4, an end view of the same as seen from line 4—4 of Figure 3;

Figure 5, a plan view of a blank used for a liner in our nursery pot, on a reduced scale; and Figure 6, a perspective view of a modified form of our nursery pot.

While we have shown only the preferred forms of the invention, we wish to have it understood that various changes or modifications may be made within the scope of the claims hereto attached, without departing from the spirit of the invention.

Referring to the drawings in detail, and particularly to the preferred form of our invention, illustrated in Figures 1 to 5, inclusive, our nursery plant pot comprises in its principal features, a basket 1 made of expanded metal, a floor 2 made of asphaltum impregnated sheet material or asphaltum paper, and a liner 3 made of similar material.

The basket 1 may be made of a flat sheet 4 of expanded metal, as illustrated in Figure 3, the sheet being elongated, rectangular in form and proportioned to make a basket of desired size. Near its lower edge the expanded metal is bent inwardly to form a channel 5 through the length thereof, the channel running parallel to the bottom edge and presenting a horizontal top face 6 which serves as a ledge for supporting the floor of the lining.

The extreme bottom portion of the expanded metal is bent over inwardly, as at 7, and follows the lower contour of the channel, as at 8, to form a smooth bottom edge 9 for the basket and to prevent cutting or injury to the hands of the opeartor handling the basket.

The extreme top edge of the blank is similarly bent upon itself, as indicated at 10, to present a smooth upper edge.

One side edge of the expanded metal blank has a strip 11 of asphaltum paper secured thereon throughout the length thereof, the paper being secured by merely pressing the expanded metal into the paper, which makes a firm bond between the paper and the expanded metal.

The edge of the expanded metal covers only about one-half of the strip, as at 12, leaving the other half, indicated at 13, free for having the opposite edge of the expanded metal impressed thereon, when the sheet of expanded metal is bent into cylindrical form.

After the sheet of expanded metal is thus firmly held in cylindrical form, it may be readily expanded into the desired conical form by merely pressing the cylindrical basket, upper end first, upon a conical body of desired shape, the expanded metal readily yielding to pressure.

The bottom liner 2 is made of asphalt paper, or similar material, water-proof, and is circular in form and dimensioned to fit on the edge 6 of the channel 5.

The side liner 3 is merely in the form of a sheet of asphalt paper or similar material, cut to present slanting side edges 14 and concentric circular upper and lower edges 15, so that it may be readily bent into conical form with the edges loosely overlapping. It is dimensioned to fit into the basket, with the bottom edge resting on the bottom liner 2, or the ledge 6 and its upper end projecting slightly above the upper edge of the basket, as shown at 16.

In use, the nurseryman may assemble the basket in the manner indicated, fill in the soil and plant the tree or shrub selected. During the period of growth the soil compacts against the liners and the latter are made to firmly adhere to the soil.

The entire assembly then forms an attractive display, much more superior in appearance to the ordinary discarded cans now commonly used for the purpose in nursery displays.

When making a sale, the nurseryman may sell the whole unit, at an increased price including the cost of the basket, or he may remove the plant with the surrounding soil and the liners out of the basket and present to the customer in that form, the cost of the liners being negligible.

In that case, the customer, when planting the tree or shrub, can easily peel off the liners, without disturbing the roots of the plant or the body of soil in which it is embedded.

In Figure 6 is shown a modified form of our invention in which the basket 20 is made of wire and comprises three rings 21, 22 and 23 suitably spaced and dimensioned to present a conical outline, with upright staves 24 welded to the rings.

The bottom of the basket 20 is made of wire netting 25 anchored to the bottom ring. The bottom liner 26 is made to rest on the wire netting and the side liner 27 is made in the manner previously described, with its edges overlapping, as at 28. This liner is preferably made to slightly project beyond the upper ring, as at 29.

The use of this form of our invention is substantially as previously described.

The nurseryman places the wall and bottom liners in the metal base and then proceeds to fill it with earth in the conventional manner of potting plants. The filled nursery pot now serves a dual function; it is a complete pot in which the young plants may be raised to partial or full maturity, and it is an attractive retail display unit.

When the plant is sold, it is easily removed from the metal basket, the earth having compacted to form a root ball. The liner paper adheres excellently to the root ball, forming thereby a temporary pot in itself, its main use being a means of transporting the plant from the nursery to the buyer's planting site.

Conceivably, the nurseryman might also raise plants in such root-ball, liner covered arrangement in back areas, reinserting them in the metal baskets as they are moved back into the display area.

At the planting site, the liner paper is easily removed by slitting with a pen knife and peeling off.

The advantages of our invention to the nurseryman are very considerable.

Our invention offers to the nurseryman a custom-designed product which is low-cost, functional and extremely attractive for retail displays.

In addition, the nurseryman derives a further dollar advantage from sales of the metal baskets themselves, at a generous mark-up. Moreover, it is deemed that the annual sales of potted plants in a given nursery will be enhanced because of our attractively styled and decorator-colored basket pot in contrast to current retail displays of semi-rusted and battered lard cans.

Further advantages to the nurseryman are that the basket-pots nest, with a tremendous saving in storage space; that the expanded metal blanks may be shipped and stored in sheet form; that less time is spent in removing the plant from the container, and the need of steel can-slitting tools is eliminated.

As far as the ultimate consumer is concerned, he will enjoy the following advantages:

(1) Ease of planting: Even though the nurseryman cuts the steel can, it is still easier to peel off the lining than to tug the plant from the steel can.

(2) Elimination of danger of cutting fingers and of problem of disposal of the empty can;

(3) Low cost as compared with comparable-sized ceramic pots and possession of a nursery pot which is practically unbreakable.

We claim:

1. As an article of manufacture, a sheet of expanded metal having parallel upper and lower edges and straight side edges with a strip of asphaltum paper impressed upon one of the side edges, so as to leave a projecting portion adapted for impressing upon the other side edge when the sheet is bent into annular form.

2. As an article of manufacture, a sheet of expanded metal having parallel upper and lower edges and straight side edges, with a strip of asphaltum paper impressed upon one of the side edges, so as to leave a projecting portion adapted for impressing upon the other side edge when the sheet is bent into annular form, the sheet being formed with an inwardly projecting groove adjacent the lower edge to form a circular ledge when the sheet is bent into annular form.

3. As an article of manufacture, a sheet of expanded metal having parallel upper and lower edges and straight side edges, with a strip of asphaltum paper impressed upon one of the side edges, so as to leave a projecting portion adapted for impressing upon the other side edge when the sheet is bent into annular form, the sheet being formed with an inwardly projecting groove adjacent the lower edge to form a circular ledge when the sheet is bent into annular form, and the upper and the lower edges being bent upon themselves to present smooth extremities.

4. A nursery pot comprising a basket formed of a single sheet of expanded metal bent into conical form and having abutting vertical edges, a conical liner of asphaltum paper mounted in said basket, a strip of asphaltum paper in overlapping relation to said abutting edges of said basket with the abutting edges of said expanded metal being embedded in said paper so as to hold said basket in said conical form, an inwardly projecting ledge formed at the smaller end of said basket, and a bottom member resting on said ledge.

References Cited in the file of this patent

UNITED STATES PATENTS

| | | |
|---|---|---|
| 861,046 | Norum | July 23, 1907 |
| 955,644 | Hershkovitz | Apr. 19, 1910 |
| 1,020,187 | Claussen | Mar. 12, 1912 |

FOREIGN PATENTS

| | | |
|---|---|---|
| 10,931 | Great Britain | 1908 |
| 366,735 | Great Britain | Feb. 11, 1932 |
| 396,564 | Great Britain | Aug. 10, 1933 |